United States Patent [19]
Liu et al.

[11] Patent Number: 5,970,233
[45] Date of Patent: Oct. 19, 1999

[54] MULTIPLE CODECS FOR VIDEO ENCODING FORMAT COMPATIBILITY

[75] Inventors: Christina K. Liu, Oakland, Calif.; Yung D. Nguyen, Portland, Oreg.

[73] Assignee: Intel Corporation, Santa Clara, Calif.

[21] Appl. No.: 08/642,051

[22] Filed: May 3, 1996

[51] Int. Cl.[6] .................................................. G06F 17/00
[52] U.S. Cl. ............................... 395/200.76; 395/200.77
[58] Field of Search ..................... 395/200.76, 200.77, 395/200.66, 330, 332; 348/15, 392; 386/81

[56] References Cited

U.S. PATENT DOCUMENTS

| | | | |
|---|---|---|---|
| 5,220,325 | 6/1993 | Ackland et al. | 341/67 |
| 5,251,205 | 10/1993 | Callon et al. | 370/60 |
| 5,258,826 | 11/1993 | Wakeland et al. | 358/12 |
| 5,313,280 | 5/1994 | Straus | 384/181 |
| 5,534,914 | 7/1996 | Flohr et al. | 348/15 |
| 5,534,928 | 7/1996 | Iwamura | 348/401 |
| 5,559,562 | 9/1996 | Ferster | 384/584 |
| 5,589,993 | 12/1996 | Naimpally | 386/81 |

*Primary Examiner*—Ellis B. Ramirez
*Attorney, Agent, or Firm*—William H. Murray; N. Stephan Kinsella

[57] ABSTRACT

A method, apparatus, and storage medium for processing video data. According to one embodiment, first data encoded in a first high level encoding format and second data encoded in a second high level encoding format are provided. The first data is decoded with a first format decoder of a video subsystem. The second data is decoded with a second format decoder of the video subsystem.

20 Claims, 5 Drawing Sheets

FIG. 1. ENCODING SYSTEM

FIG. 2. DECODING SYSTEM

501 RECEIVE FIRST FORMAT ENCODED VIDEO DATA

503 PARTIALLY DECODE DATA TO PROVIDE INTERIM-LEVEL FORMATTED DATA

505 ENCODE INTERIM-LEVEL FORMATTED DATA TO PROVIDE SECOND FORMAT ENCODED DATA

507 TRANSMIT SECOND FORMAT ENCODED DATA TO REMOTE PARTICIPANT

MULTIPLE CODECS FOR VIDEO ENCODING FORMAT COMPATIBILITY

BACKGROUND OF THE INVENTION

1. Field of the Invention

The present invention relates to the processing of video data, and, in particular, to providing for video encoding format compatibility.

2. Description of the Related Art

This invention relates to signal processing which is often used to encode data signals into an encoded bitstream and to decode such encoded bitstream to reconstruct the original data signals. Such encoded data signals are often video image signals representative of video pictures. Video pictures may be still images or may be part of a plurality of successive pictures of video signal data that represent a motion video. As used herein, "picture" and "video picture" may interchangeably refer to signals representative of an image as hereinabove described.

Video formats are typically utilized to standardize ways of encoding video data. In general, video data which is at the pixel level is encoded in accordance with a particular video format that specifies the manner of encoding the video data. Such encoding may include compressing the video data or other types of encoding. Encoded video data is encoded at a high-level format and may thus be referred to herein as high-level video data. Video data at the pixel or bitmap level is in a format suitable for display on a monitor or for other data processing, and may be considered to be in a relatively low-level format in comparison to the relatively high-level format at which the data is typically encoded. Video data in its high-level, encoded format requires less storage and communications bandwidth, but is not directly usable for processing or display, and is thus decoded before displaying the data.

Different video formats are used to represent images in computer-based image processing systems. For example, one such standard is the H.261 video standard (International Telecommunication Union (ITU), Recommendation H.261; (March 93), "Video codec for audiovisual services at p×64 kbits"). Often all the various elements or nodes of a network of interconnected computers operate in a compatible video format such as H.261. However, there may be multiple video formats, which are incompatible with each other. Thus, for a computer configured to process (i.e., decode and encode) video data in one video format, it is unable to process video data encoded in accordance with a second format.

There is, therefore, a need for methods and apparatuses that address problems arising from incompabilities in high-level video encoding formats.

SUMMARY

There is provided herein a method, apparatus, and storage medium for processing video data. According to one embodiment of the invention, first data encoded in a first high level encoding format and second data encoded in a second high level encoding format are provided. The first data is decoded with a first format decoder of a video subsystem. The second data is decoded with a second format decoder of the video subsystem.

BRIEF DESCRIPTION OF THE DRAWINGS

These and other features, aspects, and advantages of the present invention will become more fully apparent from the following description, appended claims, and accompanying drawings in which:

FIG. 5 is a flow chart of the method of operation of the transcoder of FIG. 4;

DESCRIPTION OF THE PREFERRED EMBODIMENT

The present invention provides for compatibility between different video encoding formats. In each high-level video format, video data at the bitmap level may be encoded in accordance with its particular high-level video encoding format. Similarly, encoded video data may be decoded in accordance with the applicable video format to provide bitmap video data suitable, for example, for display on a monitor. In order to convert encoded video data of a first video format into encoded video data of a second video format, the encoded video data is decoded to an interim-level format that lies between the encoded level and the bitmap level, and which is common to both video formats. For example, the interim-level format may be subsampled YUV-formatted video data. The interim-level video data is then encoded in accordance with the second video format.

There is also provided herein multiple codecs for video encoding format compatibility. In a preferred embodiment, a video subsystem of a computer system has two separate codec instances capable of decoding video encoded with two separate high-level encoding formats, respectively.

Systems for Encoding of Captured Video Signals and Decoding of Encoded Video Signals This section describes an exemplary encoding system to illustrate the encoding of captured video signals to produce encoded video signals, and an exemplary decoding system to illustrate the decoding of encoded video signals to produce bitmap-level video signals.

Figure 1:
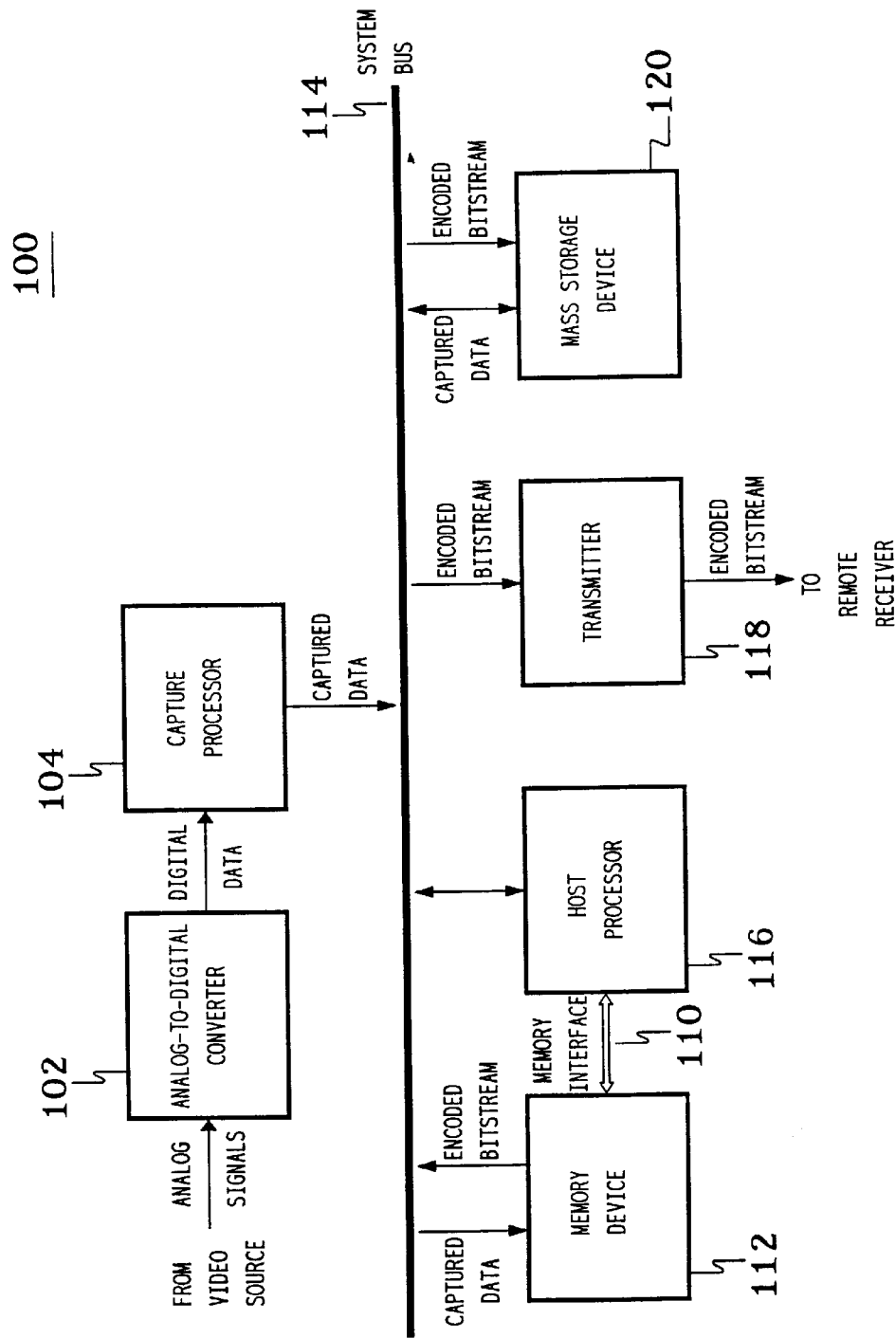
FIG. 1 is a computer system for producing encoded video signals from captured video signals, according to a preferred embodiment of the present invention.

Referring now to FIG. 1, there is shown a computer system 100 for producing encoded video signals from captured video signals, according to a preferred embodiment of the present invention. This encoding is performed in accordance with the standards of a particular video format, as will be appreciated. Analog-to-digital (A/D) converter 102 of computer system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 24-bit RGB component data). Such RGB video data is at the relatively lower bitmap or pixel level as previously described, since RGB data is in a form suitable for display on a monitor and for other processing such as image processing that operates on unencoded video data.

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data in a subsampled YUV format, such as YUV9 (i.e., YUV 4:1:1), which is discussed in further detail hereinbelow.

Capture processor 104 selectively stores the captured data to memory device 112 and/or mass storage device 120 via system bus 114. Those skilled in the art will understand that, for real-time encoding, the captured data are preferably stored to memory device 112, while for nonreal-time encoding, the captured data are preferably stored to mass storage device 120. For nonreal-time encoding, the captured data will subsequently be retrieved from mass storage device 120 and stored in memory device 112 for encode processing by host processor 116. As will be appreciated, in video conferencing systems (which use on-line, real-time encoding and decoding), each PC system may receive and decode encoded signals received from the PC systems of one or more remote participants to play the decoded video signals locally. In other situations, encoding may be done off-line.

During encoding, host processor 116 reads the captured bitmaps from memory device 112 via high-speed memory interface 110 and generates an encoded video bitstream that represents the captured video data. Depending upon the particular encoding scheme implemented, host processor 116 applies a sequence of compression steps to reduce the amount of data used to represent the information in the video images. Many video compression schemes divide images into blocks of pixels for compression purposes. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
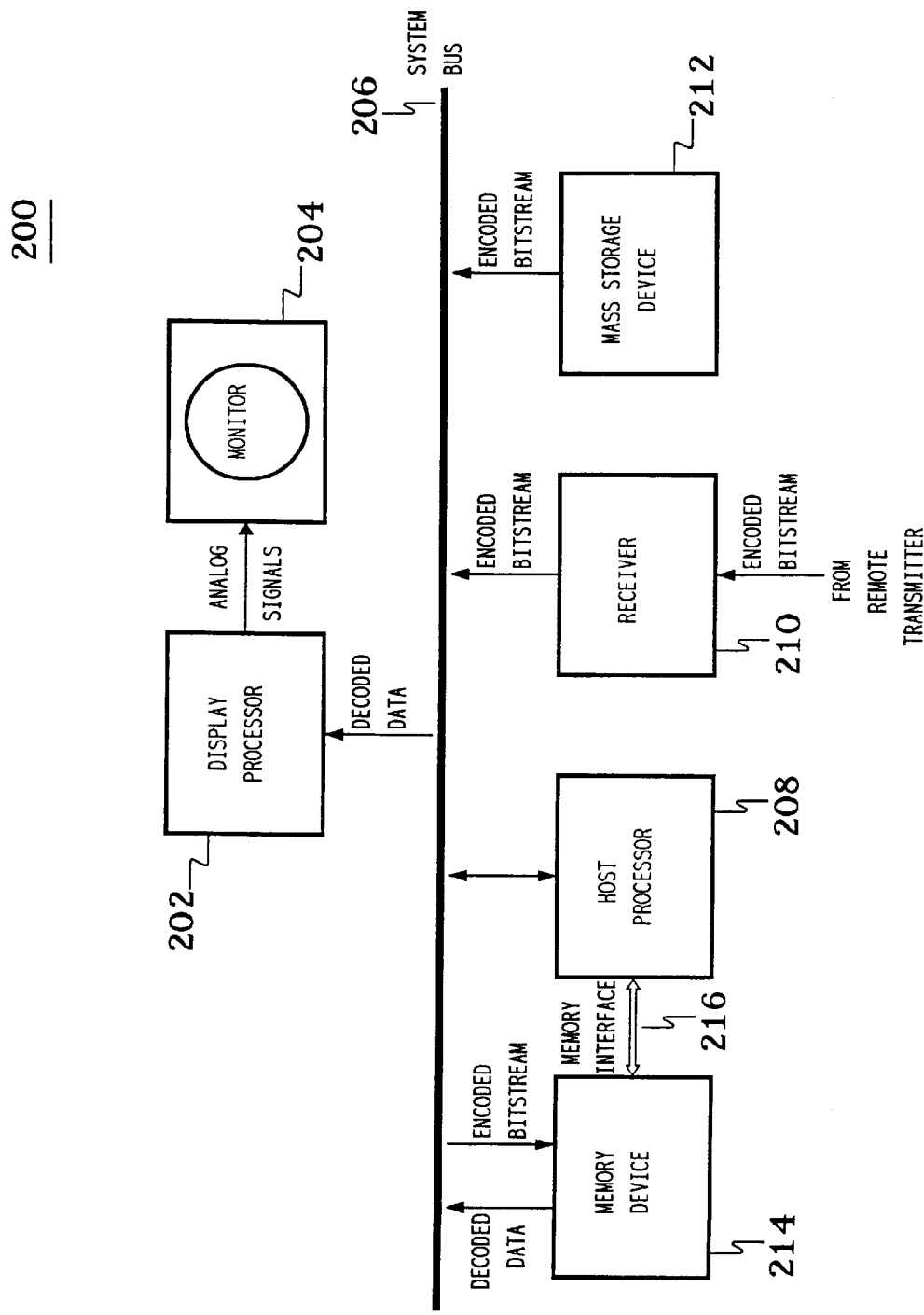
FIG. 2 is a computer-based decoding system for decoding the encoded video signals encoded by the encoding system of FIG. 1, according to a preferred embodiment of the present invention.

Referring now to FIG. 2, there is shown a computer system 200 for decoding the encoded video bitstream encoded by computer system 100 of FIG. 1, according to a preferred embodiment of the present invention. In computer system 200, the video bitstream to be decoded has been encoded in accordance with a particular high-level video encoding format, and is decoded by decoding system in accordance with this video encoding format. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206. Decoding system 200 decodes the encoded bitstream.

Host processor 208 accesses the encoded video bitstream stored in memory device 214 via high-speed memory interface 216 and decodes the encoded video bitstream for display. Decoding the encoded video bitstream involves undoing the encoding implemented by encoding system 100 of FIG. 1. Thus, as will be appreciated, host processor 208 converts high-level format, i.e. encoded, video data to low-level video data, such as RGB data. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data.

In some video encoding formats, RGB data is converted to subsampled YUV data and is then compressed or otherwise encoded. During decoding, the encoded video data first yields subsampled YUV data, which may then be converted to RGB data. This RGB data may be converted from digital to analog by display processor 202 for display on a monitor. Thus, as will be understood, the subsampled YUV level may be considered to be an interim-level encoding format, that lies between the high-level video encoding format of the fully-encoded video signals and the bitmap-level video signals, such as RGB signals, that are suitable for display on a monitor. Decoding from a high-level video encoding format to an interim-level format may be considered to be "partial decoding," and encoding from an interim-level format to a high-level video encoding format may be considered to be "partial encoding," as will be appreciated by those skilled in the art.

When the video data has been partially decoded to provide subsampled YUV data, the interim-level video data may be upsampled (e.g., from YUV9 to YUV24) or scaled as necessary, before being further decoded to a bitmap-level format (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding. Host processor 116 is preferably a general-purpose microprocessor manufactured by Intel Corporation, such as an i486™, Pentium®, or Pentium® Pro processor. System bus 114 may be any suitable digital signal transfer device and is preferably a peripheral component interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital data and is preferably a computer hard drive. Transmitter 118 may be any suitable means for transmitting digital data to a remote receiver. Those skilled in the art will understand that the encoded video bitstream may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding an encoded video bitstream and is preferably a general purpose microprocessor manufactured by Intel Corporation, such as an i486™, Pentium®, or Pentium® Pro processor. System bus 206 may be any suitable digital data transfer device and is preferably a PCI bus. Mass storage device 212 may be any suitable means for storing digital data and is preferably a CD-ROM device or a hard drive. Receiver 210 may be any suitable means for receiving the digital data transmitted by transmitter 118 of encoding system 100. Display processor 202 and monitor 204 may be any suitable devices for processing and displaying video images (including the conversion of digital video data to analog video signals) and are preferably parts of a PC-based display system having a PCI graphics board and a 24-bit RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor or other suitable component(s) to off-load processing from the host processor by performing computationally intensive operations.

Transcoding

As mentioned previously, different color formats are used to represent images in computer-based image processing systems. Standard computer monitors use a red-green-blue (RGB) color format for displaying image and graphics signals. For example, in RGB24 format, each image pixel is represented by three 8-bit component values representing the colors red, green, and blue, respectively. As will be appreciated, the RGB24 format supports $2^{24}$ different colors. Such an RGB format may be considered to be a low-level, or bitmap-level, format, since video data in this format is suitable for display on a monitor or for other data processing.

In the 3-component YUV color system, Y represents the luminance component and U and V represent chrominance components. In some high-level encoding formats, such as H.261, YUV-encoded data represents an interim-level format between RGB data and encoded data. One such YUV format is the YUV9 (or YUV4:1:1) format. In YUV9, each (4×4) block of image pixels is represented by a (4×4) block of 8-bit Y components, a single 8-bit U component, and a single 8-bit V component. Thus, the U and V components are said to be subsampled. As will be appreciated, each (4×4) block of pixels of the Y-component plane corresponds to a single pixel in the U-component plane and a single pixel in the V-component plane. As a result, each (4×4) pixel block is represented by (16×8+8+8) or 144 bits, for an average of 9 bits per pixel. Thus, the name YUV9. As will be understood, other subsampling ratios can yield other YUV formats, such as YUV12 or YUV24. Those skilled in the art will appreciate that YUVn-format data may be resampled to translate to YUVm-format data, where necessary. For example, YUV9-format data may be upsampled to provide YUV24-format data, and YUV24-format data may be subsampled to provide YUV9-format data.

Video data that is to be displayed or otherwise processed by a computer system is typically received or stored in a high-level video encoding format, such as H.261. Before displaying such video data on a monitor, for example, the computer system typically decodes the data to provide RGB data which may then be displayed on a monitor or otherwise processed. As explained above, this decoding reverses the encoding that would convert RGB video signals into the high-level video format signals.

Figure 3:
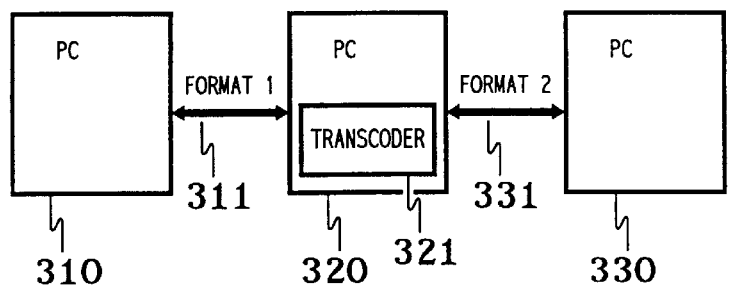
FIG. 3 is a networked computer system for performing transcoding, in accordance with a preferred embodiment of the present invention.

There can arise a need for a computer system to convert a high-level format to another high-level format. Such conversion between high-level video encoding formats may be referred to herein as transcoding. Referring now to FIG. 3, there is shown a networked computer system 300 for illustrating the transcoding of the present invention, in accordance with a preferred embodiment of the present invention. System 300 comprises PCs 310, 320, and 330. PC 310 is coupled to PC 320 via bus or line 311 and PC 330 is coupled to PC 320 via line 331. PC 310 is compatible with a first high-level encoding format, Format 1, and PC 330 is compatible with a Format 2, as illustrated by captions in FIG. 3. Thus, PC 310 is configured to receive and send video data encoded in accordance with Format 1; PC 330 is configured to receive and send video data encoded in accordance with Format 2. For example, one of these Formats may be the H.261 standard, while the other is incompatible with H.261. As will be appreciated, PCs 310, 320, 330 may be computer systems similar in configuration to encoding system 100 and decoding system 200 described previously.

Figure 4:
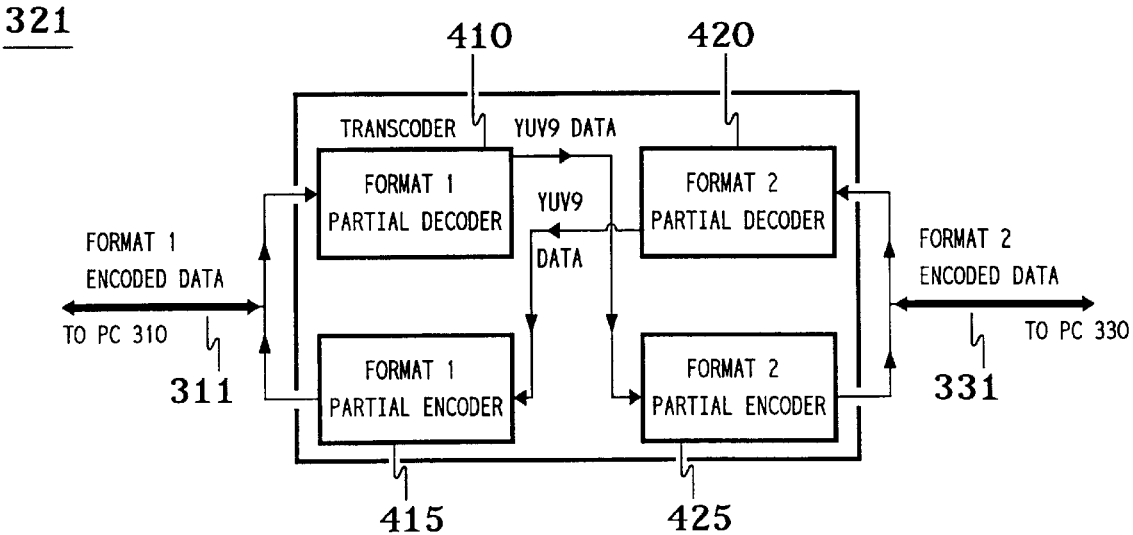
FIG. 4 shows the transcoder of a PC of the networked computer system of FIG. 3 in further detail, in accordance with a preferred embodiment of the present invention.

To transmit video data between PCs 310 and 330 it is transcoded by transcoder 321 of PC 320. Referring now to FIG. 4, there is shown the transcoder of PC 320 in further detail, in accordance with a preferred embodiment of the present invention. Transcoder 321 comprises Format 1 partial decoder 410, Format 1 partial encoder 415, Format 2 partial decoder 420, and Format 2 partial encoder 425. These encoders and decoders are referred to as "partial" because they encode to or from an interim-level format such as YUV9, as explained hereinabove.

Referring now to FIG. 5, there is shown a flow chart 500 of the method of operation of transcoder 321 of FIG. 4. First, transcoder 321 receives video data encoded at a first format (step 501). For example, Format 1 encoded video data is received by Format 1 partial decoder 410 from PC 310 via line 311. Format 1 partial decoder 410 partially decodes this first format data to generate data at an interim format (step 503), such as YUV9 formatted data, rather than fully decoding the encoded data to provide pixel-level data such as RGB data. The YUV9 data generated by decoder 410 is input to Format 2 partial encoder 425, which is configured to encode starting from YUV9 data rather than from RGB data, and to output Format 2 encoded data (step 505). This encoded data may be transmitted to a remote node compatible with Format to, such as PC 330 via line 331 (step 507).

Thus, transcoder 321 converts or transcodes Format 1 encoded data to Format 2 encoded data. As will be appreciated, decoder and encoder 420, 415 may be used similarly to transcode Format 2 encoded data to Format 1 encoded data. As will be understood, one advantage of using such partial decoders and encoders in a transcoder scheme is the savings achieved in the encoding and decoding to and from the low-level format that need not be performed for purposes of transcoding.

As will be understood, in one embodiment, partial decoders 410, 420 and partial encoders 415, 425 may be implemented in hardware, such as on separate PC plug-in boards containing appropriate processors and circuitry. In alternative preferred embodiments, partial decoders 410, 420 and partial encoders 415, 425 may be embodied in software running on one or more programmable or special-purpose processors within a computer system such as PC 320.

Multiple Codecs for Video Encoding Format Compatibility

Video subsystems typically utilize an encoder/decoder (codec) to allow an application such as a display engine to decode and display video. For instance, the video subsystem may be in a PC system that is part of a video conferencing system. The video subsystem codec is compatible with video encoded with a particular high-level encoding format, and is thus able to receive and decode encoded video from a remote node of the video conference which is encoded in the same format. As will be understood, display engines are typically software applications that receive encoded video and perform necessary decoding, such as decompression, to provide the pixel-level or bitmap-level data that may then be displayed on a monitor.

Additionally, even where the PC itself generates and transmits encoded local video to remote participants, it may be necessary or desirable to display on a monitor of the PC the local video stream only after it has been encoded. For example, hardware and software architecture and/or other processing or communications bandwidth constraints may, in some situations, make it impracticable to provide unencoded, captured video data directly to the video subsystem's display engine, where the capturing process automatically encodes any captured video. In this and other situations the codec may be necessary to decode even such locally-generated video, after it has already been encoded. Where the PC's video subsystem is configured to operate in a particular video format, the local video will be encoded in this format, and thus the video subsystem's decoder portion of its codec is also able to decode the encoded local video stream. As will be understood, the decoder can be used by the display engine to decode two encoded video streams, such as the remote and local video streams, in real time by, for example, calling two instances of the codec or by multitasking or other suitable techniques.

Figure 6:
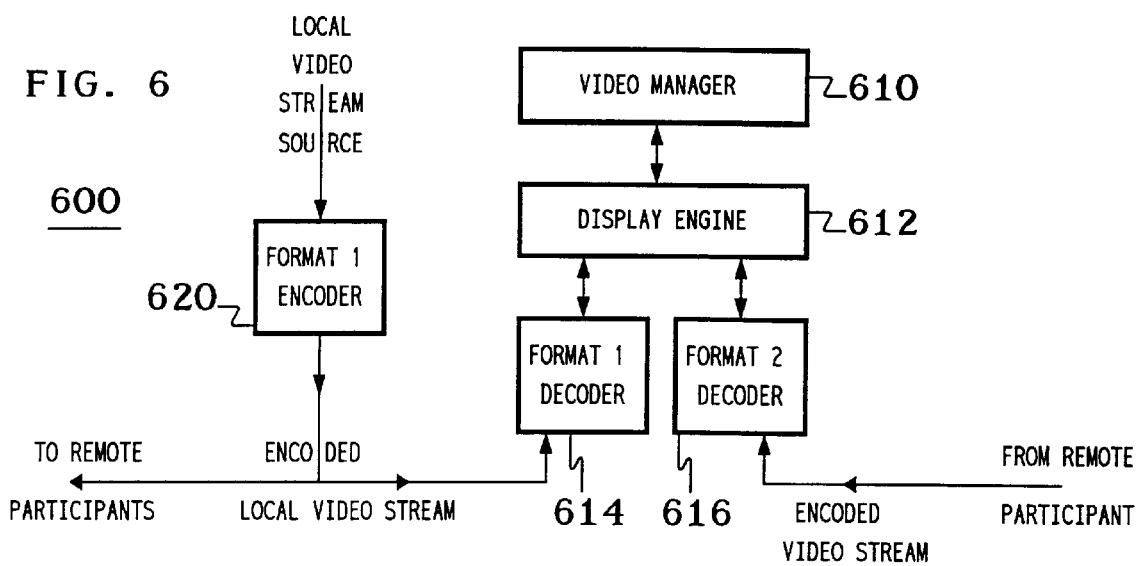
FIG. 6 is a video subsystem having two codecs, in accordance with a preferred embodiment of the present invention.

In the present invention there is provided a computer system with a video subsystem having two separate codec instances capable of decoding video encoded with two separate highlevel encoding formats, respectively. Referring now to FIG. 6, there is shown a video subsystem 600 having two codecs 614, 616, in accordance with a preferred embodiment of the present invention. As will be appreciated, the computer system comprising video subsystem 600 may be a PC-based computer similar in configuration to encoding system 100 and decoding system 200 described previously. In a preferred embodiment, the elements of FIG. 6 represent the software architecture of video system 600.

Video subsystem 600 comprises a video manager application 610 and a display engine 612, which is able to utilize Format 1 decoder 614 and Format 2 decoder 616. Video subsystem 600 also comprises, in one embodiment, a Format 1 encoder 620, which encodes a local video stream as part of the capturing process to produce a Format 1-encoded video stream, as illustrated. The encoded local video stream may then be transmitted to remote participants of a video conference, for example. In one embodiment, the encoding of Format 1-encoder 620 is part of the process by which local video is captured, so that any captured local video is not available within video subsystem in unencoded format.

As will be appreciated, decoders 614, 616 may be components of codecs or independent decoders. Format 1 decoder 614 is able to receive and decode Format 1-encoded video data, for example from Format 1 encoder 620, and Format 2 decoder 616 is able to receive and decode Format 2-encoded video data, for example a remote video stream received from a remote video conferencing node (not shown). Alternatively, as will be appreciated, Format 1 decoder 614 may also receive a remote video stream encoded in Format 1. As will be understood, the output of decoders 614, 616 that is sent to display engine 612 is in bitmap-level format, such as RGB.

Figure 7:
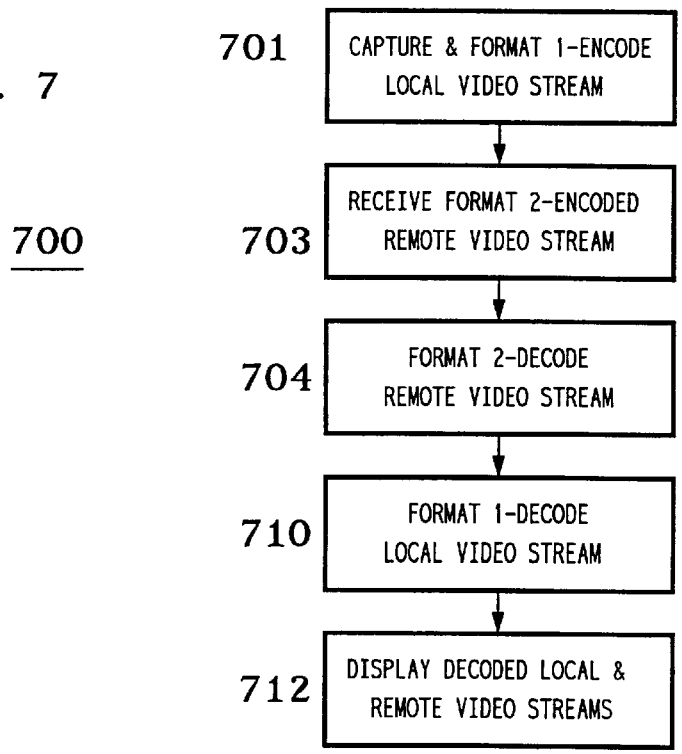
FIG. 7 is a flow chart of the method of operation of the video subsystem of FIG. 6.

Referring now to FIG. 7, there is shown a flow chart 700 of the method of operation of video subsystem 600 of FIG. 6. First, video subsystem 600 captures a local video stream, which includes the Format 1-encoding of Format 1 encoder 620 (step 701). A remote Format 2-encoded video stream is received (step 703), which is decoded by Format 2 decoder 616 (step 704). The encoded local video stream is decoded by Format 1 decoder 614 (step 710). Display engine 612 then displays the decoded local and remote video streams in respective video windows on a local monitor (step 712).

In a preferred embodiment, video subsystem 600 and the computer system of which it is a component is configured to operate with Format 1-encoded video data. In alternative embodiments, video subsystem 600 is compatible with a third encoding format which is itself incompatible with both Formats 1 and 2.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for processing video data, the method comprising the steps of:

(a) providing first data encoded in a first high level encoding format;

(b) providing second data encoded in a second high level encoding format, wherein the second data is different from the first data;

(c) decoding the first data with a first format decoder of a video subsystem to provide decoded first data; and (d) decoding the second data with a second format decoder of the video subsystem to provide decoded second data.

2. The method of claim 1, further comprising the step of:

(e) displaying the decoded first data and the decoded second data with a display engine of the video subsystem.

3. The method of claim 1, wherein:

step (a) comprises the step of capturing and encoding a local video source to provide the first data encoded in the first high level encoding format.

4. The method of claim 1, wherein:

step (b) comprises the step of receiving the second data from a remote video system.

5. The method of claim 1, wherein:

the first high level encoding format is incompatible with the second high level encoding format;

the first and second high level encoding formats include first and second video data compression formats, respectively;

step (a) comprises the step of capturing and encoding a local video source to provide the first data encoded in the first high level encoding format;

step (b) comprises the step of receiving the second data from a remote video system; and the method further comprises the steps of:
 (e) displaying in a local video window the decoded first data with a display engine of the video subsystem; and
 (f) displaying in a remote video window the decoded second data with the display engine of the video subsystem.

6. An apparatus for processing video data, the apparatus comprising:

(a) means for providing first data encoded in a first high level encoding format;

(b) means for providing second data encoded in a second high level encoding format, wherein the second data is different from the first data;

(c) first format decoder means of a video subsystem for decoding the first data to provide decoded first data; and (d) second format decoder means of the video subsystem for decoding the second data to provide decoded second data.

7. The apparatus of claim 6, further comprising:

(e) display engine means of the video subsystem for displaying the decoded first data and the decoded second data.

8. The apparatus of claim 6, wherein:

means (a) comprises means for capturing and encoding a local video source to provide the first data encoded in the first high level encoding format.

9. The apparatus of claim 6, wherein:

means (b) comprises means for receiving the second data from a remote video system.

10. The apparatus of claim 6, wherein:

the first high level encoding format is incompatible with the second high level encoding format;

the first and second high level encoding formats include first and second video data compression formats, respectively;

means (a) comprises means for capturing and encoding a local video source to provide the first data encoded in the first high level encoding format; and means (b) comprises means for receiving the second data from a remote video system; the apparatus further comprising:
 (e) display engine means of the video subsystem for displaying in a local video window the decoded first data and for displaying in a remote video window the decoded second data.

11. A storage medium having stored thereon a plurality of instructions for processing video data, wherein the plurality of instructions, when executed by a processor, cause the processor to perform the steps of:

(a) providing first data encoded in a first high level encoding format;

(b) providing second data encoded in a second high level encoding format, wherein the second data is different from the first data;

(c) decoding the first data with a first format decoder of a video subsystem to provide decoded first data; and (d) decoding the second data with a second format decoder of the video subsystem to provide decoded second data.

12. The storage medium of claim 11, further comprising:

(c) displaying the decoded first data and the decoded second data with a display engine of the video subsystem.

13. The storage medium of claim 11, wherein step (a) comprises the step of capturing and encoding a local video source to provide the first data encoded in the first high level encoding format.

14. The storage medium of claim 11, wherein step (b) comprises the step of receiving the second data from a remote video system.

15. The storage medium of claim 11, wherein:

the first high level encoding format is incompatible with the second high level encoding format;

the first and second high level encoding formats include first and second video data compression formats, respectively;

step (a) comprises the step of capturing and encoding a local video source to provide the first data encoded in the first high level encoding format;

step (b) comprises the step of receiving the second data from a remote video system; and the plurality of instructions cause the processor to perform the further steps of:
 (e) displaying in a local video window the decoded first data with a display engine of the video subsystem; and
 (f) displaying in a remote video window the decoded second data with the display engine.

16. A video subsystem for processing video data, comprising:

(a) a first format decoder; and (b) a second format encoder; wherein:

the first format decoder receives and decodes first data encoded in a first high level encoding format to provide decoded first data; and the second format decoder receives and decodes second data encoded in a second high level encoding format to provide decoded second data, wherein the second data is different from the first data.

17. The video subsystem of claim 16, further comprising:

a display engine, wherein the display engine displays the decoded first data and the decoded second data.

18. The video subsystem of claim 16, further comprising:

a first format encoder, wherein the first format encoder captures and encodes a local video source to provide the first data encoded in the first high level encoding format.

19. The video subsystem of claim 16, wherein the second data is received from a remote video system.

20. The video subsystem of claim 16, further comprising:

a first format encoder; and a display engine; wherein:

the first format encoder captures and encodes a local video source to provide the first data encoded in the first high level encoding format;

the display engine displays the decoded first data and the decoded second data the first high level encoding for at is incompatible with the second high level encoding format;

the first and second high level encoding formats include first and second video data compression formats, respectively; and the second data is received from a remote video system.

* * * * *